United States Patent [19]

Huber et al.

[11] Patent Number: 5,781,630
[45] Date of Patent: Jul. 14, 1998

[54] METHOD AND DEVICE FOR ACCURATELY DATING AN ELECTRONIC DOCUMENT

[75] Inventors: Klaus Huber, Darmstadt; Friedrich Toensing, Hoechst, both of Germany

[73] Assignee: Deutsche Telekom AG, Bonn, Germany

[21] Appl. No.: 818,464

[22] Filed: Mar. 17, 1997

[30] Foreign Application Priority Data

Mar. 16, 1996 [DE] Germany ............... 196 10 401.7

[51] Int. Cl.⁶ ..................................... H04L 9/00
[52] U.S. Cl. .................... 380/23; 380/4; 380/9; 380/25; 380/49; 380/50
[58] Field of Search ................... 380/4, 9, 23, 24, 380/25, 49, 50, 59, 28, 29

[56] References Cited

U.S. PATENT DOCUMENTS 5,189,700  2/1993  Blandford ............... 380/23

Primary Examiner—Bernarr E. Gregory
Attorney, Agent, or Firm—Kenyon & Kenyon

[57] ABSTRACT

In a method for verifying the instant that a transaction is implemented or that a document is created, signed, sent and/or received, it is provided for a time marker to be inserted into the document in a tamper-proof manner, and for the time marker to correspond to a time stamp taken from a non-adjustable clock. An arrangement for performing the method is also provided.

18 Claims, 2 Drawing Sheets

5,781,630

METHOD AND DEVICE FOR ACCURATELY DATING AN ELECTRONIC DOCUMENT

FIELD OF THE INVENTION

The invention relates to a method and an arrangement for verifying the instant or time of implementation of a cryptographic process.

RELATED TECHNOLOGY

Present-day methods employed in communications technology, such as digital or electronic signature methods, make it possible to assure the authenticity and integrity of documents in different ways. Related-art methods are described, for example, in the book by W. Fumy, H. P. Rielβ: "Kryptographie"[Cryptography], 2nd edition, Oldenbourg Publishers, 1994. These methods make it possible to protect documents from being falsified. State-of-the-art methods for producing electronic signatures often work with chip cards containing a readout-protected secret key, as well as a cryptographic processor. A widely used method is known as the RSA method, as described by R. L. Rivest, A. Shamir, L. Adleman in "A Method for Obtaining Digital Signatures and Public Key Cryptosystems", *Communications of the ACM*, vol 21, no. 2, pp. 120–126, Feb. 1978, the disclosure of which is hereby incorporated by reference herein.

However, when working with documents having a legally significant content, such as transactions or orders, as used, e.g., in securities trading, often the instant (point in time) a document is drawn up, signed, or sent is important.

SUMMARY OF THE INVENTION

An object of the present invention is to define a method and an arrangement Which will enable the instant a cryptographic process is carried out, such as the electronic signature of a document, the creation, sending or receiving, of a document, or the execution of a transaction, to be documented in a tamper-proof manner. It should also be assured that the person creating or signing the document will not be able to falsify the instant.

The means for achieving this objective are embodied in a method for verifying the instant that a transaction is completed in that a time marker is inserted in a tamper-proof manner into a document relating to the transaction, and that the time marker corresponds to a time stamp taken from a non-adjustable clock.

In a method for verifying the instant that a document is drawn up, signed, sent and/or received, the objective of the present invention is achieved by inserting a time marker into the document in a tamper-proof manner, and by having the time marker correspond to a time stamp taken from a non-adjustable clock.

The method of the present invention is applicable to all documents which exist in the form of a data file, and which have been produced, signed or otherwise processed. By including the time marker in the document in a tamper-proof manner, the time marker, once correctly inserted, is prevented from being falsified later on. Examples of applications of the method of the present invention include transactions such as withdrawing money from automatic teller machines, and the time a telephone call was made.

According to the method of the present invention, the time marker can be comprised of a date stamp, of a date and time stamp in the usual form (year, month, day, time), or it can exist in a coded form, such as the count value of a clock, which, beginning at a defined instant, merely counts clock-pulse periods of a quartz-crystal oscillator, without encoding them into customary units of time.

A non-adjustable clock in the case of the method according to the present invention is understood to be an accurate clock, preferably a quartz or other crystal-controlled clock, or a radio clock (which may for example receive encoded time signals from a satellite). The latter does, in fact, have the advantage that a high level of accuracy is guaranteed, even for the long term, and that after a battery is replaced, the correct time stamp automatically readjusts itself, but it could be subject to outside influences, if one had the right technical means, and, thus, be falsified.

To prevent this, a further refinement of the method according to the invention provides for an additional time stamp to be taken from an accurate clock, preferably a quartz clock, for the two time stamps to be compared to one another, and in the event of a time discrepancy that is greater than a predefined time discrepancy, for no time marker to be generated and/or for an error message to be output. Preferably, in the event of a time discrepancy which is smaller than the predefined time discrepancy, the time stamp of the radio clock is used for the time marker.

The time discrepancy can be so selected that, at a given accuracy of the quartz clock, the time discrepancy within an acceptable operating time will not be Greater than the predefined time discrepancy. However, the predefined time discrepancy should remain within an order of magnitude that is not critical to the verification of the instant. Accordingly, a deviation in the radio clock's time stamp would not be troublesome when the time-discrepancy remains under that which is predefined. However, if there is a falsification of a greater time discrepancy, it will no longer be possible for the time marker to be produced. If indicated, a suitable error message can be provided, e.g., in that a hard copy or protocol is printed out, pointing out this circumstance.

A further refinement of the invention provides for a location marker produced by a position-finding system to be additionally inserted into the document.

The non-adjustable clock and, in some instances, the position-finding system can also be so composed in accordance with the method of the present invention that the date stamp and, if indicated, the location marker are transmitted, while cryptographically secured, by at least one remotely arranged device.

In one arrangement for verifying the instant that a transaction is carried out, the present invention provides that a time stamp, which is inserted as a time marker in a tamper-proof manner into a document relating to the transaction, be extractable from a non-adjustable clock.

An arrangement for verifying the instant that a document is created, signed, sent and/or received is so composed in accordance with the invention that a time marker is inserted so as to be forgery-proof into the document, and that the time marker corresponds to a time stamp which is extracted from a non-adjustable clock.

It is preferably provided for the clock, together with an autonomous current source, to be arranged so as to be inaccessible, except for the time stamp query, in a cryptomodule.

A cryptomodule, which contains memories that are protected from outside modifications, can have different designs. In the arrangement of the invention, the cryptomodule is preferably a chip card.

The cryptomodule can contain an accurate clock, preferably a quartz clock, or a radio clock. To increase security, it is also possible for both an accurate clock as well as a quartz clock to be provided in the cryptomodule.

To increase security with respect to tampering with the time marker, the arrangement according to the invention can provide for an additional time stamp to be extractable from an accurate clock, preferably a quartz clock, for both time stamps to be compared to one another and, in the event of a time discrepancy that is greater than a predefined time discrepancy, for no time marker to be produced and/or for an error message to be output.

When a time discrepancy is less than the predefined time discrepancy, the time stamp of the radio clock is preferably used for the time marker.

A further development of the arrangement according to the invention consists in arranging a location-finding device, preferably a GPS (Global Positioning System) receiver, in a cryptomodule, the specific location stamp (for example containing latitude and longitude information) being extractable from said receiver to produce a location marker to be inserted into the document.

The non-adjustable clock and, in some instances, the position-finding system can also be realized in accordance with the method of the invention in that the time stamp and, in some instances, the location marker are transmitted, cryptographically secured, by at least one remotely arranged device.

BRIEF DESCRIPTION OF THE DRAWINGS

An exemplary embodiment of the invention is depicted in the drawings and elucidated in the following description, in which.

DETAILED DESCRIPTION

Figure 1:
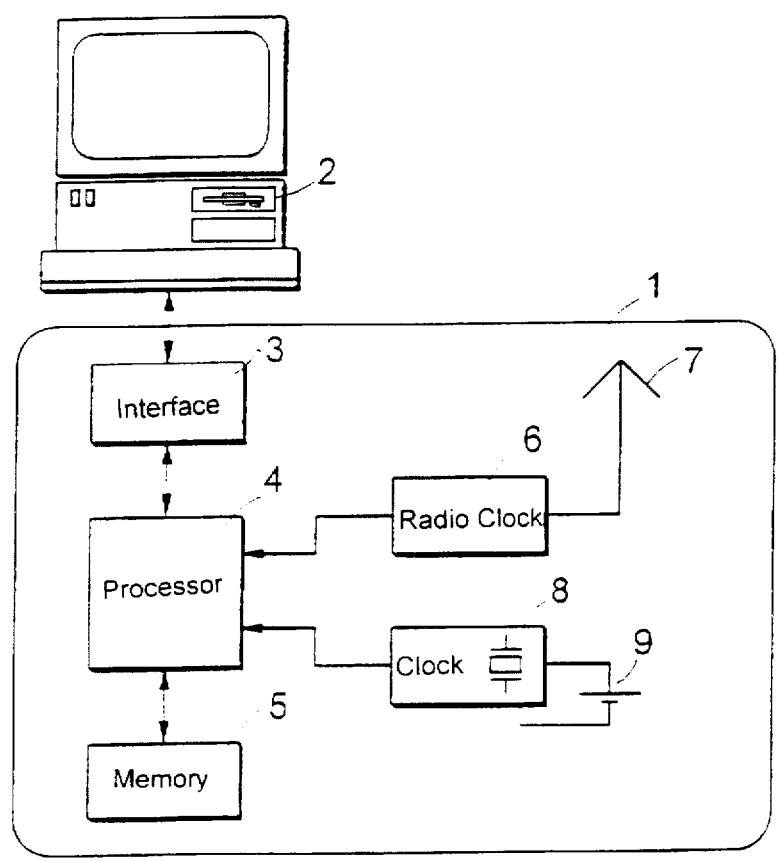
FIG. 1 shows an arrangement of the present invention.

As shown in FIG. 1, a cryptomodule 1 is linked to a computer 2, in which documents are created or worked on. Cryptomodule 1 contains one interface 3 for connecting computer 2 to processor 4 of the cryptomodule. Stored in a memory 5 are algorithms and constants for encoding, for generating an electronic signature, and for producing time markers that are inserted into the document. For example, an RSA algorithm private key may be stored in memory 5.

Furthermore, processor 4 is connected to a radio clock 6, which receives signals via an antenna 7 from a time marker transmitter. Furthermore, a quartz clock 8, which is kept constantly in operation by a battery 9, is linked to processor 4.

A document created in computer 2 is encoded in a generally known way with the help of processor 4 prior to being sent and, in some instances, signed. The transmission can take place, for example, via an interface (not shown) of computer 2 and a telecommunications network. In the illustrated exemplary embodiment, clocks 6, 8 are queried for inserting a time marker. Both time markers are compared, for example in a comparator in the processor 4. In the case that the time discrepancy is smaller than a predefined value, the time stamp from radio clock 6 is added as a time marker to the document and subsequently encoded, together with the document and, if indicated, signed.

By "accurate clock" is meant a clock which is accurate to within +/−30 seconds per month. The term "time stamp" as used herein may comprise date information. The implementation instant relating to a document may be a transaction embodied by the document, or a drawing up or signature of the document, or sending and/or receipt of the document.

Figure 2:
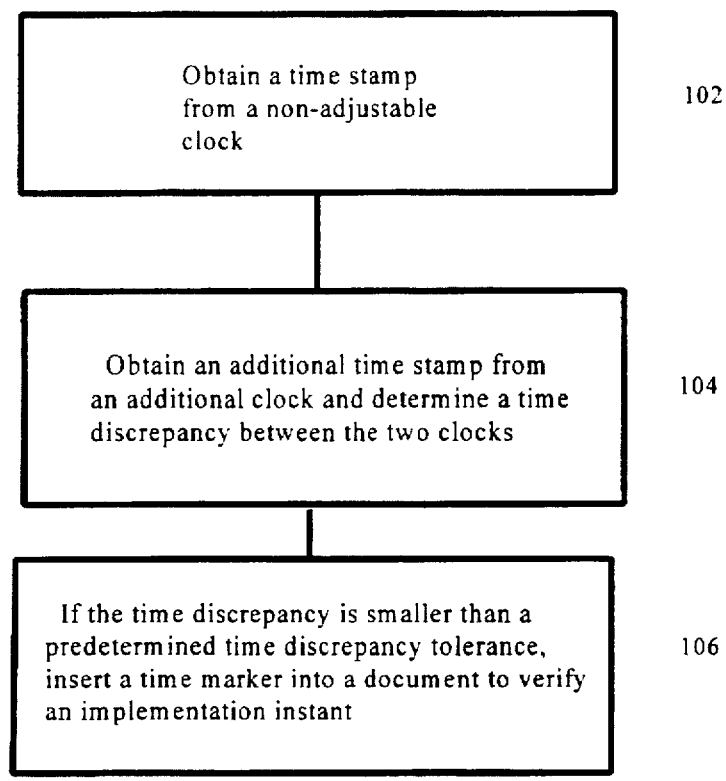
FIG. 2 shows a flowchart of the method of the present invention.

FIG. 2 shows a flowchart of the method of the present invention. After a proof of the implementation instant is requested, for instance when a document is signed, a time stamp is obtained from a non adjustable clock (Step 102). If an additional clock is present, a time discrepancy is determined between the two clocks (Step 104). A time marker is then inserted into the document (in the case of an additional clock, only if the time discrepancy is sufficiently small) so as to be tamper-proof, for example inserted within the document while the document is encoded cryptographically with a private key. (Step 106).

What is claimed is:

1. A method for dating an electronic document, the method comprising the steps of:

obtaining a time stamp from a clock;

obtaining an additional time stamp from an additional clock;

comparing the additional time stamp to the time stamp to determine a time discrepancy;

defining a time discrepancy tolerance; and inserting a time marker into The electronic document.

2. The method as recited in claim 1 wherein if the time discrepancy is greater than the time discrepancy tolerance, an error message is generated.

3. The method as recited in claim 1 wherein if the time discrepancy is greater than the time discrepancy tolerance, the inserting step is canceled.

4. The method as recited in claim 1 wherein the clock is a quartz clock.

5. The method as recited in claim 4 wherein the additional clock is a radio-controlled clock.

6. The method as recited in claim 1 wherein the clock is a radio-controlled clock.

7. The method as recited in claim 1 farther comprising the step of inserting a location marker into the electronic document.

8. The method as recited in claim 1 wherein the time stamp is encrypted and transmitted by at least one remotely arranged device.

9. The method as recited in claim 1 wherein the clock is accurate to within 30 second per month.

10. Apparatus for dating all electronic document comprising:

a first clock for providing a time stamp;

a second clock for providing a second time stamp;

a processor receiving inputs from the first clock and the second clock, the processor for comparing the time stamp and the second time stamp and for inserting a time marker into the electronic document; and a memory connected to the processor.

11. The apparatus as recited in claim 10 further comprising a chip card, the processor being located in the chip card.

12. The apparatus as recited in claim 10 further comprising an interface connected to the processor.

13. The apparatus as recited in claim 12 further comprising a chip card, the processor and the interface being located in the chip card.

14. The apparatus as recited in claim 10 wherein the first clock is a radio-controlled clock.

15. The apparatus as recited in claim 10 wherein the first clock is a quartz clock.

16. The apparatus as recited in claim 15 wherein the second clock is a radio-controlled clock.

17. The apparatus as recited in claim 10 further comprising an antenna for receiving encrypted data for the first clock.

18. The apparatus as recited in claim 10 wherein the memory stores an encryption key.

* * * * *

UNITED STATES PATENT AND TRADEMARK OFFICE
CERTIFICATE OF CORRRECTION

PATENT NO. : 5,781,630                                                          Page 1 of 3
DATED : July 14, 1998
INVENTOR(S) : Huber et al.

It is certified that error appears in the above-identified patent and that said Letters Patent is hereby corrected as shown below:

On the title page, add the following to item [56]

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 4 | 4 | 7 | 8 | 0 | 8/22/95 | Hartman, Jr. | | | |
| | | 5 | 0 | 0 | 1 | 7 | 5 | 2 | 03/19/91 | Fischer, A. | | | |
| | | 5 | 1 | 8 | 9 | 7 | 0 | 0 | 02/23/93 | Blandford, R. | | | |
| | | | | | | | | | | | | |

UNITED STATES PATENT AND TRADEMARK OFFICE
CERTIFICATE OF CORRRECTION

PATENT NO. : 5,781,630  
DATED : July 14, 1998  
INVENTOR(S) : Huber et al.

Page 2 of 3

It is certified that error appears in the above-identified patent and that said Letters Patent is hereby corrected as shown below:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 5 | 1 | 6 | 8 | 9 | 8 | | 12/9/92 | EPO | | | | |
| | | 6 | 2 | 4 | 0 | 1 | 4 | A2 | 11/9/94 | EPO | | | | |
| | | 6 | 2 | 4 | 0 | 1 | 4 | A3 | 11/9/94 | EPO | | | | |
| | | 4 | 4 | 1 | 1 | 7 | 8 | 0 | 10/12/95 | Germany | | | | |
| | | | | | | | | | | | | | | |

UNITED STATES PATENT AND TRADEMARK OFFICE
CERTIFICATE OF CORRRECTION

PATENT NO. : 5,781,630
DATED : July 14, 1998
INVENTOR(S) : Huber et al.

It is certified that error appears in the above-identified patent and that said Letters Patent is hereby corrected as shown below:

OTHER DOCUMENTS

|   |   |
|---|---|
|   | Heinz Schulte, "Telecommunication," Interest Verlag GmbH, Vol. 3, June 1994, pp. 1-10. |
|   | Christoph Ruland, "Safe Transmission and Archiving of Electronic Documents," In Datacom 3/91, pp. 120-122, 124, 126, 128, and 130. |

Signed and Sealed this

Sixth Day of April, 1999

Attest:

Q. TODD DICKINSON

*Attesting Officer*  *Acting Commissioner of Patents and Trademarks*